United States Patent
Karukaya et al.

(10) Patent No.: US 6,300,386 B1
(45) Date of Patent: Oct. 9, 2001

(54) EXPANDABLE SYNTHETIC RESIN COMPOSITION, SYNTHETIC RESIN FOAMS, AND METHODS FOR MANUFACTURING SYNTHETIC RESIN FOAMS

(75) Inventors: Koichi Karukaya; Kenji Miyazaki; Koshi Kawabata, all of Kyoto (JP)

(73) Assignee: Sekisui Chemical Co., Ltd., Osaka (JP)

(*) Notice: Subject to any disclaimer, the term of this patent is extended or adjusted under 35 U.S.C. 154(b) by 0 days.

(21) Appl. No.: 09/269,193

(22) PCT Filed: Sep. 30, 1997

(86) PCT No.: PCT/JP97/03474

§ 371 Date: Mar. 30, 1999

§ 102(e) Date: Mar. 30, 1999

(87) PCT Pub. No.: WO98/14507

PCT Pub. Date: Apr. 9, 1998

(30) Foreign Application Priority Data

Sep. 30, 1996 (JP) .................................................. 8-258915
Sep. 30, 1996 (JP) .................................................. 8-258916
Nov. 1, 1996 (JP) .................................................. 8-291832
Mar. 26, 1997 (JP) .................................................. 9-73683

(51) Int. Cl.$^7$ ..................................................... C08J 9/10
(52) U.S. Cl. ............................................. 521/137; 521/138
(58) Field of Search ...................................... 521/138, 137

(56) References Cited

U.S. PATENT DOCUMENTS

| | | | | |
|---|---|---|---|---|
| 4,745,135 | * | 5/1988 | Thomas et al. | 521/114 |
| 4,798,849 | * | 1/1989 | Thomas et al. | 521/137 |
| 5,210,107 | | 5/1993 | Jester et al. . | |
| 5,547,996 | * | 8/1996 | Brandon et al. | 521/134 |

FOREIGN PATENT DOCUMENTS

| | | |
|---|---|---|
| 0495444A2 | 7/1992 | (EP) . |
| 4-318039 | 11/1992 | (JP) . |
| 5-2695 | 1/1993 | (JP) . |
| 6-98666 | 12/1994 | (JP) . |

* cited by examiner

Primary Examiner—Morton Foelak
(74) Attorney, Agent, or Firm—Arent Fox Kintner Plotkin & Kahn, PLLC

(57) ABSTRACT

An expandable synthetic resin composition capable of providing a synthetic resin foam excellent in both heat distortion resistance and mechanical strength, as well as such a synthetic resin foam, are provided. An expandable synthetic resin composition incorporating a thermoplastic resin, a liquid crystal resin and a heat-decomposable foaming agent, as well as a synthetic resin foam which incorporates a thermoplastic resin and a liquid crystal resin dispersed in the thermoplastic resin and exhibits an expansion ratio of 1.1–50, are provided.

11 Claims, No Drawings

EXPANDABLE SYNTHETIC RESIN COMPOSITION, SYNTHETIC RESIN FOAMS, AND METHODS FOR MANUFACTURING SYNTHETIC RESIN FOAMS

FIELD OF THE INVENTION

The present invention relates to expandable synthetic resin compositions for use in the manufacture of synthetic resin foams, synthetic resin foams and methods for manufacturing synthetic resin foams, and more particularly to expandable synthetic resin compositions capable of providing foams that exhibit excellent heat distortion resistance and mechanical strength, such synthetic resin foams and methods for manufacturing the same.

PRIOR ART

Thermoplastic foams have come into widespread use as cushioning materials, heat insulation, electrical insulating materials and the others.

However, these conventional thermoplastic foams have not been completely satisfactory in their performances, as in uses where higher degrees of heat distortion resistance and mechanical strength are required. In view thereof, various methods have been proposed which include dispersing reinforcing fibers, e.g., glass fibers in a foam, and laminating a reinforcing member on a foam surface for bonding thereof.

In Japanese Patent Laying-Open No. Hei 4-110219, for example, a method is disclosed which extrudes a foam containing a dispersion of reinforcing material such as glass fibers. This method however performs foam extrusion while rigid and straight reinforcing fibers, such as glass fibers, are under dispersion. Accordingly, those fibers readily break foam cells to prevent production of foams that exhibit high expansion ratios. Also, fiber breakage caused within an extruder or die results in problematic failure to impart sufficient reinforcing effect.

In addition, those foams obtained by using the above method have imparted reinforcement thereto by incorporating reinforcing fibers such as glass fibers. Due to the fiber breakage, the attempts to recover such foams for recycling purposes nearly failed. The difficulty in reusing foam scraps forced disposal thereof.

On the other hand, Japanese Patent No. 2,503,109 discloses a method which reinforces a foam by compressively heat-bonding the form at its surfaces to a cloth. The cloth is comprised of conjugate fibers and/or conjugate yarns respectively containing adhesive and reinforcing components. Although this method achieves such effects as imparting increased rigidity to the plate-form foam and preventing the foam from flying apart when fractured by impact, the foam itself increases in weight, and the strength of a foam layer per se remains unchanged.

Japanese Patent Laying-Open Nos. Hei 3-179,040 and 3-179,042 respectively disclose foam molding of liquid crystalline polymers, instead of thermoplastic resins, which is capable of producing molded foams having increased mechanical strength. However, foaming liquid crystalline polymers alone results in production of foams having expansion ratios of no more than 2. Consequently, beneficial properties of foams, i.e., lightweight and heat insulating properties can not be imparted to the resulting, molded foam products.

SUMMARY OF THE INVENTION

It is an object of the present invention to provide an expandable synthetic resin composition capable of producing foams which are excellent in both heat distortion resistance and mechanical strength and also exhibit higher expansion ratios, such synthetic resin foams and methods for manufacturing the same.

A first invention of the present application is the aforementioned expandable synthetic resin composition which is characterized as including a thermoplastic resin, a liquid crystal resin (or polymer) and a heat-decomposable foaming agent.

The expandable synthetic resin composition preferably contains 0.1–60 parts by weight of the liquid crystal resin, and 40–99.9 parts by weight of the thermoplastic resin.

The expandable synthetic resin composition further contains the heat-decomposable foaming agent in an amount of 0.5–30 parts by weight, based on 100 parts by weight of the aforementioned thermoplastic and liquid crystal resins.

In the expandable synthetic resin composition, it is preferred that the aforementioned thermoplastic resin consists at least partly of a crosslinking resin.

It is further preferred that the aforementioned liquid crystal resin is fibrillated.

A second invention of the present application is a synthetic resin foam characterized as including a thermoplastic resin and a liquid crystal resin dispersed in the thermoplastic resin, and as having been expanded to an expansion ratio of 1.1–50.

For the synthetic resin foam in accordance with the present invention, 0.1–60 parts by weight of the liquid crystal resin is mixed with 40–99.9 parts by weight of the aforementioned thermoplastic resin for dispersion of the liquid crystal resin therein.

It is also preferred that the above-stated liquid crystal resin is at least partly fibrillated.

In the synthetic resin foam in accordance with the present invention, the aforementioned thermoplastic resin is comprised preferably of a polyolefin resin, more preferably of a combination of a non-crosslinking polyolefin resin and a crosslinking polyolefin resin.

A third invention of the present application is a method for manufacturing a synthetic resin foam characterized as including the steps which follow. In a first step, a mixture of a liquid crystal resin and a thermoplastic resin having a melting point or temperature lower than a liquid crystal transition point of the liquid crystal resin is extruded by an extruder at a temperature not lower than the transition point of the liquid crystal resin. In a second step, a heat-decomposable foaming agent which decomposes at a temperature not lower than the melting point or temperature of the thermoplastic resin but below the liquid crystal transition point of the liquid crystal resin is added to the extruded mixture to melt mix them at a temperature not lower than the melting point or temperature of the thermoplastic resin but below a decomposition initiating temperature of the heat-decomposable foaming agent. In a third step, the mixture thus melt mixed is formed to obtain an expandable, primary mixed resin form. In a fourth step, the expandable, primary mixed resin form is heated to a temperature not lower than the decomposition initiating temperature of the foaming agent but below the liquid crystal transition point of the liquid crystal resin to allow foaming thereof.

In the method for manufacturing a synthetic resin foam, in accordance with the third invention, it is preferred that the thermoplastic resin preferably consists at least partly of a cross-linking resin, and that the method further includes a step of crosslinking the thermoplastic resin after formation of the expandable, primary mixed resin form.

A fourth invention of the present application is a method for manufacturing a synthetic resin foam. The method is characterized as including a first step of supplying to an extruder a liquid crystal resin, a thermoplastic resin having a melting point or temperature lower than a liquid crystal transition point of the liquid crystal resin, and a heat-decomposable foaming agent having a decomposition initiating temperature which exceeds the melting point or temperature of the thermoplastic resin, melt mixing them at a temperature not lower than the melting point or temperature of the thermoplastic resin but below the decomposition initiating temperature of the heat-decomposable foaming agent, and extruding. The method further includes a second step of heating the expandable, primary mixed resin extrusion obtained from the afore-described extruding to a temperature not lower than the decomposition initiating temperature of the heat-decomposable foaming agent and not lower than the liquid crystal transition point of the liquid crystal resin to allow foaming thereof.

In the method for manufacturing a synthetic resin foam, in accordance with the fourth invention, it is preferred that the thermoplastic resin preferably consists at least partly of a cross-linking resin, and that the method further includes a step of crosslinking the thermoplastic resin after the aforesaid first extruding step.

A fifth invention of the present application is a method for manufacturing a synthetic resin foam which is characterized as including a step of feeding to an extruder a liquid crystal resin, a thermoplastic resin having a melting point or temperature lower than a liquid crystal transition point of the liquid crystal resin, and a volatile foaming agent or inorganic gas for mixing thereof. Characteristically, the mixed resin composition is foamed either during or after the extrusion.

In the method for manufacturing a synthetic resin foam, in accordance with the fifth invention, it is preferred that the above-specified thermoplastic resin, liquid crystal resin and volatile foaming agent or inorganic gas are mixed in the extruder at a temperature not lower than the liquid crystal transition point of the liquid crystal resin, and that the mixed resin composition is extruded through an extruder die at a temperature not lower than the liquid crystal transition point and foamed.

In the methods for manufacturing a synthetic resin foam, in accordance with the third through fifth inventions, it is also preferred that the liquid crystal resin is fibrillated.

Also in the methods for manufacturing a synthetic resin foam, in accordance with the third through fifth inventions, the aforementioned thermoplastic resin is comprised preferably of a polyolefin resin, more preferably of a polyolefin resin including a combination of a non-crosslinking polyolefin resin and a crosslinking polyolefin resin.

The detailed explanation of the present invention is given below.

EXPANDABLE SYNTHETIC RESIN COMPOSITION IN ACCORDANCE WITH THE FIRST INVENTION

Cited as thermoplastic resins for use in the preparation of the expandable synthetic resin in accordance with the present invention are melt-fabricable resins such as ABS resins, ethylene-vinyl acetate copolymers, fluoroplastics, acetal resins, amide resins, imide resins, amide-imide resins, acrylic resins, vinyl chloride resins, polyolefin resins, polyesters, polycarbonates, polyacrylates, polyphenylene oxides, polystyrenes, thermoplastic polyurethanes, and modified materials or blends (alloys) thereof.

Among those resins, polyolefin resins, polystyrenes, and copolymers thereof are preferred for use as the aforementioned thermoplastic resins. The use of polyolefin resins is more preferred.

Polyolefin resins are particularly useful when obtaining synthetic resin foams which are excellent in mechanical properties, e.g., in bending deflection. Cited as polyolefin resins are homopolymers such as low-density polyethylenes, high-density polyethylenes, straight-chain low-density polyethylenes, and homopolypropylenes; and copolymers such as random polypropylenes, block polypropylenes, ethylene-vinyl acetate copolymers (EVA), and ethylene-acrylate copolymers (EEA). Particularly preferred among these resins are low-density polyethylenes, homopolypropylenes and high-density polyethylenes. These polyolefin resins may be employed solely or in any combination thereof.

It is also preferred that the aforesaid thermoplastic resin consists at least partly of a crosslinking thermoplastic resin. The crosslinking resin is not particularly specified, but must be capable of being crosslinked by a crosslinking technique as will be hereinafter described to provide foams having increased expansion ratios. It is particularly preferred that a combination of non-crosslinking and crosslinking polyolefin resins is employed as the aforementioned thermoplastic resin.

Useful crosslinking polyolefin resins include polyolefin resins which incorporate either peroxides or reactive monomers; silane-crosslinking polyolefin resins; and polyolefin resins capable of being crosslinked upon irradiation as with electron rays. Exemplary methods of crosslinking those crosslinking resins include the use of peroxides, aqueous crosslinking, and exposing to ionizing radiations.

The above crosslinking methods will be later described in detail.

Where the polyolefin resin is comprised of the above-stated combination of non-crosslinking and crosslinking polyolefin resins, it is preferred that 1–99 parts by weight of non-crosslinking polyolefin resin is mixed with 99–1 parts by weight of crosslinking polyolefin resin. Any suitable technique, e.g., melt kneading as by a twin-screw extruder, may be employed to mix non-crosslinking and crosslinking polyolefin resins.

In the event the above-stated combination of non-crosslinking and crosslinking polyolefin resins is chosen, it is preferred that the mixture of non-crosslinking and crosslinking polyolefin resins is crosslinked to such a crosslinking level that the residual solids content (gel fraction) after immersion in a hot xylene solution for 24 hours falls in the 5–40 weight % range.

The aforesaid combined use of non-crosslinking and crosslinking polyolefin resins facilitates production of foams excellent in mechanical properties and having increased expansion ratios.

The above-stated liquid crystal resin for use in the preparation of the expandable synthetic resin in accordance with the present invention may be any liquid crystal resin, so far as it has a liquid crystal transition point of not lower than a melting point or temperature of the aforesaid thermoplastic resin. Preferred liquid crystal resins include, but not limited to, thermoplastic liquid crystal polyesters and thermoplastic polyester amides. In specific, those totally- or semi-aromatic polyester liquid crystal resins commercially available under the trade designations VECTRA, ECONOL, ZEIDER, LODRUN, etc., may be cited.

In the present invention, a mixing proportion of the liquid crystal resin to the thermoplastic resin must be selected such that its concentration level does not adversely affect the ability of a resin composition as a whole to be foam extruded. The proportion may be suitably selected depending upon the composition of the thermoplastic resin and performance required for end products. The liquid crystal resin level is generally in the range of 0.1–60 parts by weight, preferably 1–30 parts by weight, more preferably 3–20 parts by weight, based on 100 parts by weight totally of the thermoplastic and liquid crystal resins. If the mixing proportion of liquid crystal resin falls below 0.1 parts by weight, the liquid crystal resin becomes excessively small in amount to possibly cause reduction in both heat distortion resistance and mechanical strength of the resulting foams. On the other hand, if it goes beyond 60 parts by weight, liquid bubbles occasionally appear in the resultant foams, resulting in failure to obtain foams having uniform cells.

The respective compositions of liquid crystal and thermoplastic resins determine their mutual compatibility in a resulting mixed resin composition. When necessary to improve the compatibility, a compatibilizer may be added to the mixed resin composition either prior to or during extrusion. Applicable compatibilizers include graft polymers containing moieties of the liquid crystal resin, and graft polymers containing polar moieties such as carboxyl and amino groups. The compatibilizer may be added in an amount generally of 0.01–20 parts by weight, preferably of 0.1–5 parts by weight, based on 100 parts by weight totally of the liquid crystal and thermoplastic resins.

It is also preferred that the aforementioned liquid crystal resin for use is at least partly rendered into fibril form. The "fibril form" as used herein refers to the state where an aspect ratio (dispersion length/dispersion diameter) of the liquid crystal resin dispersed in the thermoplastic resin exceeds 1. In the present invention, the preferred aspect ratio of fibril is not lower than 10. Also, a fibril diameter is preferably 0.1–100 $\mu$m, more preferably 1–10 $\mu$m.

Such fibrillation of the liquid crystal resin can be accomplished by applying an external force, e.g. a shear or tensile stress, to the composition consisting of liquid crystal and thermoplastic resins at a temperature of not lower than the liquid crystal transition point of the liquid crystal resin. The application of the external force also serves to promote dispersion of fibrillated liquid crystal resin throughout the composition.

Also in the below-described methods of the third through fifth inventions for manufacturing a synthetic resin foam, a shear stress may be applied to the composition residing in an extruder or die to fibrillate the liquid crystal resin. In order to fibrillate the liquid crystal resin in a matrix resin, it is desired that an apparent shear rate subjected to the composition is preferably $1\times10^2$–$1\times10^5$ sec$^{-1}$, more preferably $3\times10^2$–$1\times10^4$ sec$^{-1}$. The extrusion of a blend at a shear rate within such a range is effective in enhancing fibrillation of liquid crystal resin in the blend to produce fibrillated liquid crystal resin which generally has a fibril diameter of 10 $\mu$m or less and a fibril length of 0.1 mm or greater.

The fibrillation of the liquid crystal resin can also be accomplished by foaming the below-described expandable, primary mixed resin form or extrusion at a temperature of not lower than the liquid crystal transition point whereby a tensile stress produced as bubbles expand is exerted on the liquid crystal resin for stretching thereof.

When used in fibril form, the liquid crystal resin provides an enhanced reinforcing effect. Accordingly, the use of expandable synthetic resin composition in accordance with the present invention results in the manufacture of foams which exhibit further improved rigidity and mechanical strength, as well as increased expansion ratios.

The aforementioned heat-decomposable foaming agent is the material which decomposes when heated to produce gases. Examples of specific heat-decomposable foaming agents include azodicarbonamide, azobisisobutyronitrile, N, N'-dinitrosopentamethylenetetramine, 4, 4'-oxybis(benzene sulfonyl hydrazide), benzene sulfonyl hydrazide, toluenesulfonyl hydrazide, barium azodicarboxylate, trihydrazine triazine. These materials may be used solely or in any combination thereof.

The amount of heat-decomposable foaming agent to be mixed in the primary mixed resin form or extrusion may be suitably chosen depending upon the desired expansion ratio, and is preferably 0.5–30 parts by weight, based on 100 parts by weight totally of the thermoplastic and liquid crystal resins.

SYNTHETIC RESIN FOAM IN ACCORDANCE WITH THE SECOND INVENTION

A synthetic resin foam in accordance with the present invention is characterized as including the aforementioned thermoplastic resin and liquid crystal resin dispersed in the thermoplastic resin, and as having been foamed to an expansion ratio of 1.1–50. The thermoplastic and liquid crystal resins as used herein may be those used in the preparation of the aforementioned expandable synthetic resin composition.

For the synthetic resin foam in accordance with the present invention, the expansion ratio is suitably selected depending upon the resin composition, required performance and use of end products, but is generally 1.1–50, as stated above, preferably 1.5–50, more preferably 2–30. If it goes beyond 50, uniformity of cell distribution and cell size of the resulting foam is disturbed, failing to obtain foams with cells uniformly distributed therein. On the other hand, if it falls below 1.5, the typical foam properties start to become unobtainable, and if below 1.1, such a trend becomes remarkable.

A mixing proportion of the thermoplastic resin to the liquid crystal resin in the preparation of the synthetic resin foam in accordance with the second invention can be selected analogously to the case of the aforementioned expandable synthetic resin composition. Accordingly, its description is omitted here by referring to the description on the expandable synthetic resin composition.

Also in the synthetic resin foam in accordance with the present invention, it is preferred that the liquid crystal resin is at least partly rendered into fibril form, whereby the enhanced toughness and mechanical strength of the synthetic resin foam are insured. The meaning of "fibril form" is given above.

A degree of fibrillation of the liquid crystal resin contained in the foam is visually discernable through a microscopic or soft X-ray observation.

In the present invention, it is desired that 10% or higher fraction of the liquid crystal resin is fibrillated for dispersion to an aspect ratio of 2 or higher.

Again, the synthetic resin foam in accordance with the present invention incorporates the aforementioned polyolefin resin as the preferred thermoplastic resin, since it is capable of imparting increased mechanical strength. The combination of non-crosslinking and crosslinking polyolefin resins is effective in producing foams having increased expansion ratios.

METHOD FOR MANUFACTURING A SYNTHETIC RESIN FOAM IN ACCORDANCE WITH THE THIRD INVENTION

In the method of the third invention for manufacturing a synthetic resin foam, the aforementioned thermoplastic and liquid crystal resins are first melt mixed and extruded. In this step, a technique is generally employed by which the liquid crystal resin, as well as the thermoplastic resin having a melting point or temperature lower than the liquid crystal transition point of the liquid crystal resin, are supplied to an extruder either simultaneously or consecutively for subsequent extrusion at a temperature not lower than the liquid crystal transition point of the liquid crystal resin.

A mixing proportion of the thermoplastic resin to the liquid crystal resin may preferably be within the range as specified in the explanation of the first invention.

In such a case, it is desired that the liquid crystal resin contained in the thermoplastic resin has been rendered into fibril form, as described above, to impart increased strength and heat resistance to the resulting foam.

As stated earlier, the application of the external force, such as a shear or tensile stress, to the composition at a temperature of not lower than the liquid crystal transition point of the liquid crystal resin not only enables fibrillation of the liquid crystal resin, but also promotes dispersion of fibrillated liquid crystal resin throughout the composition.

A mixture of the aforementioned thermoplastic and liquid crystal resins may be extruded into any form, but preferably into a pellet or particulate form, if taken into account the subsequent mixing with the heat-decomposable foaming agent.

The mixture of thermoplastic and liquid crystal resins obtained in the manner as described above is then mixed with the heat-decomposable foaming agent and formed to obtain an expandable, primary mixed resin form. An extrusion method may be preferably utilized to manufacture the expandable, primary mixed resin extrusion. More specifically, a technique is employed which supplies to an extruder the heat-decomposable foaming agent and the aforementioned mixture either simultaneously or consecutively, effects melt mixing thereof at a temperature below the decomposition initiating temperature of the foaming agent, and extrudes the melt.

Usable as the above heat-decomposable foaming agent are those referred to in the explanation of the first invention. In this case, the selected heat-decomposable foaming agent preferably has a decomposition temperature of higher than a melting point or temperature of the aforementioned thermoplastic resin. Also, the use amount of the heat-decomposable foaming agent desirably follows the amount as specified earlier.

Also, the shape of the expandable, primary mixed resin form is not particularly specified, and may be suitably chosen depending upon the selected final forming technique or the shape required for a finished foam product. In view of the following step of forming a foam, it is preferably in the form of a sheet or pellet, more preferably in the form of beads pellet.

The expandable, primary mixed resin form includes the aforementioned mixture of thermoplastic and liquid crystal resins, and the heat-decomposable foaming agent. In obtaining the expandable, primary mixed resin extrusion, any conventionally known technique can be employed to preliminarily mix them prior to extrusion. For example, those techniques may be employed by which the aforementioned mixture of thermoplastic and liquid crystal resins, as well as the heat-decomposable foaming agent, are dry mixed in a mixer section such as a tumbler, or alternatively melt mixed in a kneader.

Foaming of the expandable, primary mixed resin form is effected by heating the form to a temperature not lower than the decomposition temperature of the foaming agent but below the transition point of the liquid crystal resin. It is desired here that the liquid crystal resin is in a solid form and at least partly in the form of fibrils dispersed throughout the expandable, primary mixed resin form. In such a case, the fibril form of liquid crystal resin is effective in reinforcing the resulting foams.

Where the temperature to which the form is heated in the foaming step is not lower than the liquid crystal transition point temperature of the liquid crystal resin, the liquid crystal resin is brought into a molten condition and its change in form undesirably brings about increased dispersion diameter, so that a satisfactory reinforcing effect occasionally becomes unobtainable.

In the step of foaming the expandable, primary mixed resin form, a specific technique may be suitably chosen from conventionally-known forming techniques. Illustrating a technique of obtaining a foamed sheet, the expandable, primary mixed resin form incorporating the foaming agent may be rendered into a sheet form, pressed between two belts, and heated for continuous foaming.

The expandable, primary mixed resin form can be foamed by subjecting to injection molding, i.e., by supplying pellets thereof to an injection molding machine and then subjecting them to injection molding. It can also be foamed by subjecting to extrusion, i.e., by supplying the pelletized expandable, primary mixed resin form to an extruder and then subjecting them to extrusion.

In the method of the third invention for manufacturing the synthetic resin foam, it is preferred that the above-specified thermoplastic resin consists at least partly of crosslinking thermoplastic resin which may be crosslinked subsequent to production of the expandable, primary mixed resin form, as referred to in the explanation of the first invention. The use of such a crosslinking thermoplastic resin, if at least partly, imparts increased expansion ratios and lightweight properties to the resulting foams.

In such a case, as the expandable, primary mixed resin form is placed in the crosslinking step, at least a part of the thermoplastic resin is crosslinked to increase extension viscosity of the mixed resin, making possible to obtain more stable foams having increased expansion ratios.

As stated earlier, the aforementioned thermoplastic resins can be crosslinked by using a crosslinking technique which involves adding peroxide, aqueous crosslinking, or exposing to ionizing radiations.

In the crosslinking technique which involves adding peroxide, any type of radical-forming agent such as benzoyl peroxide, either solely or in combination with vinyl group-containing monomer (styrene, for example) or polymer (butadiene polymer), is mixed with the thermoplastic resin. The mixture is then heated to a temperature of not lower than a decomposition temperature of the selected peroxide to cause crosslinking. In the present invention, such a peroxide, either with or without the others, can be preloaded in the thermoplastic resin which is later subjected to extrusion. Either heat history until completion of extrusion or heat treatment after extrusion enables crosslinking thereof.

For the aqueous crosslinking technique, the silane-crosslinking polyolefin resin may be employed. The primary resin mixed form produced in the manner as described above is brought into contact with water or water vapor to thereby cause crosslinking thereof. The duration of such a contact, as well as the temperature maintained during the contact, may be suitably selected.

The "silane-crosslinking polyolefin resin", as used herein, refers to a thermoplastic resin, such as polyethylene or polypropylene, to which an unsaturated group-containing silane compound is grafted for modification, or a copolymer thereof. Examples of unsaturated group-containing silane compounds include vinyltrimethoxysilane, and γ-methacryloxypropyl trimethoxy silane.

The above-defined silane-crosslinking polyolefin resin contains an alkoxy group (a methoxy group, for example) which, when contacted with water, is hydrolyzed to produce a silanol group (a hydroxyl group). This hydroxyl group reacts with another hydroxyl group present in the other molecule to produce an Si—O—Si linkage. As a result, a crosslinked thermoplastic resin is obtained.

A silanol condensation catalyst may be additionally used to promote crosslinking. Examples of silanol condensation catalysts include dibutyltin diphthalate, cobalt octoate, and zinc stearate. The silanol condensation catalyst may be added in an amount of 0.001–10 weight %, based on the weight of the silane-crosslinking polyolefin resin.

In the crosslinking technique which involves exposing to ionizing radiation, a formed product is crosslinked by irradiation with electron or gamma rays. In this case, the aforementioned peroxide, vinyl group-containing monomer, or the others, may be additionally employed.

The other crosslinking techniques include UV and visible light irradiation techniques. In these cases, an initiator may be suitably incorporated in the thermoplastic resin, which decomposes when irradiated with an ultraviolet or visible light to produce radicals.

The above-described crosslinking techniques may be employed solely or in any combination thereof. It is desired that the crosslinking treatment is carried out prior to foaming. In accordance with the present invention, since the crosslinking polyolefin is crosslinked prior to foaming, a greater degree of melt extensibility can be imparted to the primary mixed resin form, making possible to obtain foams having increased expansion ratios.

In the technique which uses a crosslinking resin as at least a part of the thermoplastic resin, the crosslinking thermoplastic resin may be used in combination with a non-crosslinking thermoplastic resin. The aforementioned polyolefin resins may be employed for such non-crosslinking and crosslinking thermoplastic resins.

METHOD FOR MANUFACTURING A SYNTHETIC RESIN FOAM IN ACCORDANCE WITH THE FOURTH INVENTION

In the method of the fourth invention for manufacturing a synthetic resin foam, a liquid crystal resin, a thermoplastic resin having a melting point or temperature of lower than a liquid crystal transition point of the liquid crystal resin, and a heat-decomposable foaming agent having a decomposition initiating temperature of higher than the melting point or temperature of the thermoplastic resin are first supplied to an extruder. Useful liquid crystal resins, thermoplastic resins and heat-decomposable foaming agents are those described in the explanations respectively given with regard to the first through third inventions. Particularly, a polyolefin resin can be suitably employed as the thermoplastic resin.

Unlike the method according to the third invention, the method of the fourth invention further mixes the heat-decomposable foaming agent with the liquid crystal and thermoplastic resins in the extruder. The supply of the heat-decomposable foaming agent to the extruder may be effected either simultaneously with or subsequent to the supply of those liquid crystal and thermoplastic resins. Conventionally-known preliminary mixing techniques can be employed to mix them, which include a dry mixing technique using a mixer such as a tumbler, and a technique using a kneader for melt mixing.

Next, the above mixture is extruded to obtain an expandable, primary mixed resin extrusion. The shape of the expandable, primary mixed resin extrusion may be suitably chosen depending upon the selected technique of forming a foam and the desired shape of a finished foam product. When taken into account the subsequent step of forming a foam, it is preferably rendered into a sheet or pellet form.

The above expandable, primary mixed resin extrusion is subsequently allowed to foam by heating to a temperature of not lower than a decomposition initiating temperature of the foaming agent and not lower than a liquid crystal transition point of the liquid crystal resin. This foaming step is carried out in the same manner as employed in the method of the third invention for manufacturing a synthetic resin foam. Accordingly, the explanation thereof is omitted here by referring to the corresponding description as given in the explanation of the method of the third invention for manufacturing a synthetic resin foam.

That is, the aforesaid steps taken to obtain the expandable, primary mixed resin extrusion simply distinguishes the method of the fourth invention for manufacturing a synthetic resin foam from the third invention. The foaming step itself can be carried out in the same manner as in the method of the third invention for manufacturing a synthetic resin foam.

Also in the method of the fourth invention for manufacturing a synthetic resin foam, the liquid crystal resin is preferably rendered into fibril form to impart enhanced strength and heat resistance to a resultant foam, as analogously to the method of the third invention for manufacturing a synthetic resin foam. The fibrillation of liquid crystal resin can also be achieved pursuant to the utilization of an external force such as a stretch stress developed as bubbles expand.

Also in the method of the fourth invention for manufacturing a synthetic resin foam, the thermoplastic resin preferably consists at least partly of a crosslinking thermoplastic resin which is crosslinked subsequent to formation of the expandable, primary mixed resin extrusion. As a result, a foam can be obtained which is more stable and has an increased expansion ratio. The techniques as described earlier can be suitably employed to effect the crosslinking.

METHOD FOR MANUFACTURING A SYNTHETIC RESIN FOAM IN ACCORDANCE WITH THE FIFTH INVENTION

In the method of the fifth invention for manufacturing a synthetic resin foam, a liquid crystal resin, a thermoplastic resin having a melting point or temperature of lower than a liquid crystal transition point of the liquid crystal resin, and either one of a volatile foaming agent and an inorganic gas are first supplied to and mixed in an extruder. Useful liquid crystal and thermoplastic resins are described earlier. Preferably, a polyolefin resin is used as the thermoplastic resin. It is also preferred that the thermoplastic resin consists at least partly of a crosslinking thermoplastic resin.

The volatile foaming agent is suitably selected from materials which can volatilize at a temperature of not lower than the liquid crystal transition point of the liquid crystal resin and act as foaming agents. Illustrative volatile foaming agents include chain hydrocarbons such as butane, pentane, hexane, and heptane; cyclic hydrocarbons such as cyclobutane, cyclopentane, and cyclohexane; and halogenated hydrocarbons such as trichlorofluoromethane, dichlorodifluoromethane, and trichlorotrifluoroethane. These volatile foaming agents may be employed solely or in any combination thereof.

The aforementioned inorganic gas is suitably selected from inorganic gases which can act as foaming agents as analogously to the volatile foaming agents. Examples of the inorganic gases include carbon dioxide, nitrogen, neon and argon gases. These can be employed solely, or in any combination thereof, i.e., as a mixed gas.

In the case where a polyolefin resin is employed as the thermoplastic resin, carbon dioxide or carbon dioxide-containing inorganic gas is particularly useful, since they are highly soluble in the polyolefin resin.

The use of inorganic gas as the foaming agent permits provision of foams without causing environmental pollution. In this regard, the inorganic gas is a more preferable foaming agent than the aforementioned volatile foaming agent.

In the method of the fifth invention for manufacturing a synthetic resin foam, the aforementioned thermoplastic and liquid crystal resins, as well as either one of the aforementioned volatile foaming agent and inorganic gas, are supplied to and mixed in an extruder. In mixing them, the thermoplastic resin, liquid crystal resin, and either one of the aforementioned volatile foaming agent and inorganic gas, may be separately supplied to the extruder and foamed. Alternatively, the thermoplastic and liquid crystal resins may be mixed to prepare a mixed resin form. This mixed resin form and either one of the aforementioned volatile foaming agent and inorganic gas may be respectively supplied to the extruder and foamed.

In view of the later-practiced step of manufacturing a foam, the mixed resin form is preferably shaped into a pellet form.

The use amount (supply under pressure) of either one of the volatile foaming agent and inorganic gas is dependent upon the selected type of the volatile foaming agent or inorganic gas, the selected type of the resin composition and the desired expansion ratio. In general, it is preferably in the range of 1–100 g/minute. The supply pressure thereof is preferably controlled in the range of 25–150 kg/cm$^2$, as given by readings of a pressure gage mounted to a delivery section of the extruder.

If the use amount of the volatile foaming agent or inorganic gas is excessively small, the gas expansion pressure during foaming occasionally decreases to a level insufficient to produce uniform and fine cells in the resulting foam. On the other hand, if the use amount of the volatile foaming agent or inorganic gas is excessively large, the gas expansion pressure developed during foaming possibly increases to such a level that cell membranes are disrupted, thereby making difficult to impart enhanced surface properties or increased expansion ratios to the resulting foams.

Next, the resin composition incorporating the above-described thermoplastic resin, liquid crystal resin and either one of the volatile foaming agent and inorganic gas is foamed either during or after extrusion thereof. In the case where it is foamed while extruded, a technique can be employed, for example, which utilizes a vented extruder having a vent port through which the aforementioned volatile foaming agent or inorganic gas, as the foaming agent, is compressively introduced for injection into the melt mixed resin composition residing in the extruder. However, the present invention is not to be considered as limited to such a technique.

The other techniques may alternatively be employed. For example, a compressed volatile foaming agent or inorganic gas may be introduced through a material feed throat for injection into the resin composition, with the material feed throat being suitably closed. A perforated extruder screw may be employed to introduce a compressed volatile foaming agent or inorganic gas through perforations for injection into the resin composition.

The resin composition in a molten state, into which the volatile foaming agent or inorganic gas has been injected, is continuously extruded through an extruder die, located at a distal end of the extruder, into a desired shape. The subsequent pressure release initiates foaming of the resin composition. The shape of extruder die is not particularly specified, and may desirably be analogous to a target shape of the resulting foam.

The temperature at which the resin composition is extruded through the extruder die is preferably controlled in the range of not lower than the liquid crystal transition point of the liquid crystal resin.

The resin composition thus extruded through the extruder die is allowed to foam in a satisfactory fashion to provide a closed-cell foam which has uniform and small cells, as well as exhibiting an increased expansion ratio. In order to better maintain the shape of the resin composition extruded through the extruder die, it may desirably be cooled with water or cold air.

Again, in the method of the fifth invention for manufacturing a synthetic resin foam, the liquid crystal resin is preferably rendered into fibril form to thereby impart enhanced mechanical strength and heat resistance to resultant foams.

In the method of the fifth invention for manufacturing a synthetic resin foam, the liquid crystal resin can be fibrillated when foam extruded. More specifically, the resin composition containing the thermoplastic and liquid crystal resins is mixed in the extruder at a temperature of not lower than the liquid transition point of the liquid crystal resin. As the resin composition is extruded through the extruder die at the aforementioned temperature of not lower than the transition point and allowed to foam, a stretch force developed during foaming is applied to the liquid crystal resin. This stretch force can thus be utilized to fibrillate the liquid crystal resin.

EFFECTS OF THE INVENTION

The expandable synthetic resin composition in accordance with the first invention of the present application includes a thermoplastic resin, a liquid crystal resin and a heat-decomposable foaming agent. Foams obtained by using the expandable synthetic resin composition are reinforced by the liquid crystal resin. It accordingly becomes possible to provide foams which exhibit excellent heat distortion resistance and mechanical strength, as well as maintaining representative foam properties such as lightweight properties and heat resistance.

Particularly when 0.1–60 parts by weight of the liquid crystal resin is mixed with 40–99.9 parts by weight of the thermoplastic resin, synthetic resin foams can be obtained which exhibit further enhanced heat distortion resistance and mechanical strength.

Also, where the aforementioned thermoplastic resin consists at least partly of a crosslinking resin, crosslinking of such a crosslinking thermoplastic resin further imparts increased mechanical strength, heat distortion resistance and expansion ratio to resultant foams.

Also, if used in fibril form, such a fibrillated liquid crystal resin imparts further increased heat distortion resistance and mechanical strength to resulting foams.

The synthetic resin foam in accordance with the second invention of the present application includes a thermoplastic resin and a liquid crystal resin dispersed throughout the thermoplastic resin, and has an expansion ratio in the range of 1.1–50. Since the thermoplastic resin foam is reinforced by the liquid crystal resin, heat distortion resistance and mechanical strength thereof can be improved. Unlike liquid crystal resin foams, the increased expansion ratio is also obtainable.

Also, the synthetic resin foam in accordance with the second invention exhibits further improved heat distortion resistance and mechanical strength, provided that it incorporates thermoplastic and liquid crystal resins in the above-specified proportions.

Also in the second invention, the liquid crystal resin may be at least partly fibrillated to impart further increased heat distortion resistance, mechanical strength and expansion ratio to a resulting foam. When a polyolefin resin is employed as the aforementioned thermoplastic resin, a polyolefin foam can be obtained which exhibits excellent mechanical properties such as flexural properties.

Where the aforementioned polyolefin resin is comprised of non-crosslinking and crosslinking polyolefins, crosslinking of the polyolefin resin provides foams having further increased expansion ratios.

In accordance with the method of the third invention for manufacturing a synthetic resin foam, a liquid crystal resin and a thermoplastic resin having a melting point or temperature lower than a transition point of the liquid crystal resin are mixed and extruded at a temperature not lower than the transition point of the liquid crystal resin to obtain an extrusion mixture. A heat-decomposable foaming agent, which decomposes at a temperature not lower than the melting point or temperature of the thermoplastic resin but below the liquid crystal transition point of the liquid crystal resin, is added to the extrusion mixture for melt mixing thereof at a temperature not lower than the melting point or temperature of the thermoplastic resin but below the decomposition initiating temperature of the heat-decomposable foaming agent to obtain an expandable, primary mixed resin form. The synthetic resin foam of the second invention is obtainable by heating the expandable, primary mixed resin form as obtained above to a temperature not lower than the decomposition initiating temperature of the foaming agent but below the liquid crystal transition point of the liquid crystal resin to allow foaming thereof.

In such an event, the application such as of a shear stress to the liquid crystal resin while extruded serves to fibrillate at least a part of the liquid crystal resin, making possible to obtain a synthetic resin foam having further enhanced heat distortion resistance and mechanical strength.

Where the aforementioned thermoplastic resin consists at least partly of a crosslinking resin, a foam having further increased mechanical strength and expansion ratio is obtainable by crosslinking the thermoplastic resin subsequent to production of the expandable, primary mixed resin form.

In accordance with the method of the fourth invention for manufacturing a synthetic resin foam, liquid crystal and thermoplastic resins, as well as a heat-decomposable foaming agent, are fed to an extruder, melt mixed at a temperature not lower than a melting point or temperature of the thermoplastic resin but below a decomposition initiating temperature of the heat-decomposable foaming agent, and extruded to obtain an expandable, primary mixed resin extrusion. Like the third invention, the provision of the synthetic resin foam of the second invention is insured by heating the expandable, primary mixed resin extrusion as obtained above to a temperature not lower than the decomposition initiating temperature of the foaming agent and not lower than the liquid crystal transition point of the liquid crystal resin to allow foaming thereof.

In the method of the fourth invention for manufacturing a synthetic resin foam, when the aforementioned expandable, primary mixed resin extrusion is foamed, a stretch force acts on the liquid crystal resin so that at least a part thereof is fibrillated. This further improves heat distortion resistance and mechanical strength of a resulting foam.

Also in the method of the fourth invention for manufacturing a synthetic resin foam, a foam having further increased mechanical strength and expansion ratio is obtainable by employing a crosslinking resin as at least a part of the thermoplastic resin which is crosslinked after completion of the extrusion process.

In the method of the fifth invention for manufacturing a synthetic resin foam, thermoplastic and liquid crystal resins, as well as either one of a volatile foaming agent and an inorganic gas, are fed to an extruder and mixed. The mixed resin composition is foamed either during or after extrusion thereof. This insures the provision of the synthetic resin foam of the second invention. In accordance with the method of the fifth invention for manufacturing a synthetic resin foam, the synthetic resin foam of the second invention is readily obtainable by feeding the thermoplastic and liquid crystal resins, as well as either one of the volatile foaming agent and inorganic gas, to the extruder in a continuous or consecutive manner, and effecting foaming thereof.

Also in this case, the thermoplastic and liquid crystal resins, as well as either one of the volatile foaming agent and inorganic gas, are preferably mixed in the extruder at a temperature of not lower than the transition point of the liquid crystal resin, extruded through an extruder die at a temperature of not lower than the transition point of the liquid crystal resin, and foamed. The liquid crystal resin can be at least partly fibrillated due to the action of a stretch force produced during the foaming, so that a foam can be obtained which exhibits further increased mechanical strength and expansion ratio.

DESCRIPTION OF THE PREFERRED EXAMPLES

Example 1

10 parts by weight of LODRUN LC3000 manufactured by Unitika Co. (liquid crystal transition temperature of 180° C., as determined by DSC (differential scanning calorimeter)), as a liquid crystal resin, and 90 parts by weight of homopolypropylene (melting point of 165° C. as determined by DSC, melt index MI=0.3, manufactured by Mitsubishi Chem. Co., EA 9A), as a thermoplastic resin, were melt mixed in a 30 mm extruder set at a cylinder temperature of 200° C., and extruded in the form of strands for subsequent cutting into pellets.

The pellets thus obtained were fed to a 50 mm single-screw extruder for subsequent foam extrusion at a rate of 20 kg/hour. Here, carbon dioxide as a blowing gas was injected under a pressure of 265 kg/cm$^2$.

The composition, which incorporates the mixed resin melt containing the liquid crystal and thermoplastic resins, as well as carbon dioxide, was extruded, through an extruder die maintained at a temperature of 167° C. and having an exit with a gap of 3 mm and a width of 500 mm, to a smooth finished, cooled mold which was directly coupled to the die exit and measured 10 mm thick and 150 mm wide. The foam thus obtained exhibited an expansion ratio of 20, and was found to have uniform cells.

Example 2

10 parts by weight of LODRUN LC5000 manufactured by Unitika Co. (liquid crystal transition temperature of 285° C. as determined by DSC), as a liquid crystal resin, and 90 parts by weight of homopolypropylene (melting point of 165° C., MI=0.3), as a thermoplastic resin, were melt mixed in a 30 mm extruder set at a cylinder temperature of 290° C., and extruded in the form of strands which were taken off while stretched for subsequent cutting into pellets. Here, the existing form of liquid crystal resin contained in the pellets was observed using an electron microscope (at 500× magnification). Not lower than 90%, i.e. the majority of the liquid crystal resin was found to be present in fibril form.

The pellets obtained were fed to a 50 mm single-screw extruder for subsequent foam extrusion at a rate of 20 kg/hour, in the same manner as in Example 1. Here, carbon dioxide as a blowing gas was injected under a pressure of 265 kg/cm$^2$.

The composition, which incorporates the mixed resin melt containing the liquid crystal and thermoplastic resins, as well as carbon dioxide, was extruded, through an extruder die maintained at a temperature of 167° C. and having an exit with a gap of 3 mm and a width of 50 mm, to a smooth finished, cooled mold which was directly coupled to the die exit and measured 10 mm thick and 150 mm wide. The foam thus obtained exhibited an expansion ratio of 20, and was found to have uniform cells. Also, the foam was dissolved in a hot xylene to observe the form of remaining liquid crystal resin with the electron microscope. Not lower than 60%, i.e. the majority of the liquid crystal resin was found to remain in fibrillated form.

Example 3

10 parts by weight of LODRUN LC5000 manufactured by Unitika Co. (liquid crystal transition temperature of 285° C. as determined by DSC), as a liquid crystal resin, and 90 parts by weight of olefin resin, as a thermoplastic resin, including 70 weight % of non-crosslinking homopolypropylene (manufactured by Mitsubishi Chem. Co., MA 3, melting point of 163° C., MI=10) and 30 weight % of silane-crosslinking homopolypropylene (manufactured by Mitsubishi Chem. Co., XPM 800H, melting point of 167° C.), were melt mixed in a twin-screw extruder set at a cylinder temperature of 290° C., and extruded in the form of strands for subsequent cutting into pellets.

100 parts by weight of the pellets and 11 parts by weight of azodicarbonamide (foaming agent, decomposition initiating temperature=200° C.) were melt mixed in a twin-screw extruder set at a cylinder temperature of 175° C., and extruded through a sheet-form die (exit dimensions: a width of 100 mm and a gap of 1 mm).

The extrusion was immersed in a boiling water at 100° C. for 4 hours for crosslinking treatment.

The extrusion was heated in an oven at 230° C. for 10 minutes to allow foaming thereof to thereby obtain a foamed sheet 300 mm wide and 3 mm thick. The foamed sheet exhibited an expansion ratio of 20. The foamed sheet was ruptured under the presence of liquid nitrogen to observe its rupture cross-section using an electron microscope. The fibril-form liquid crystal resin was found to be dispersed in polypropylene which formed cell membranes. Not lower than 60% of liquid crystal resin was found to be fibrillated.

Example 4

10 parts by weight of LODRUN LC3000 manufactured by Unitika Co. (liquid crystal transition temperature of 180° C. as determined by DSC), as a liquid crystal resin, and 90 parts by weight of olefin resin, as a thermoplastic resin, which includes 80 weight % of non-crosslinking high-density polyethylene resin (manufactured by Mitsubishi Chem. Co., HY 540, melting point of 135° C., MI=1) and 20 weight % of silane-crosslinking polyethylene (manufactured by Mitsubishi Chem. Co., HF 700N, melting point of about 130° C.), were melt mixed in a twin-screw extruder set at a cylinder temperature of 200° C., and extruded in the form of strands for subsequent cutting into pellets.

100 parts by weight of the pellets and 11 parts by weight of azodicarbonamide (foaming agent, decomposition initiating temperature=200° C.) were melt mixed in a twin-screw extruder set at a cylinder temperature of 165° C., and extruded through a sheet-form die (exit dimensions: a width of 100 mm and a gap of 1 mm).

The extrusion was immersed in a boiling water at 100° C. for 4 hours for crosslinking treatment.

The extrusion was heated in an oven at 220° C. for 10 minutes to obtain a foamed sheet 300 mm wide and 3 mm thick. The foamed sheet exhibited an expansion ratio of 20. The foamed sheet was ruptured under the presence of liquid nitrogen to observe its rupture cross-section using an electron microscope. The fibril-form liquid crystal resin was found to be dispersed in polyethylene which formed cell membranes (not lower than 30% of liquid crystal resin was found to be fibrillated).

Example 5

The procedure of Example 1 was followed to obtain a foam, except that 65 parts by weight of LODRUN LC3000 manufactured by Unitika Co. (liquid crystal transition temperature of 180° C., as determined by DSC), as a liquid crystal resin, and 35 parts by weight of homopolypropylene (melting point of 165° C., MI=0.1) as a thermoplastic resin, were melt mixed in a 30 mm extruder set at a cylinder temperature of 200° C., and extruded in the form of strands for subsequent cut into pellets. The foam exhibited an expansion ratio of about 3. A visual observation revealed lack of uniformity in cell diameter, as well as somewhat uneven cell formation.

Comparative Example 1

The procedure of Example 1 was repeated to obtain a foam, except that the pellets were used which were comprised solely of homopolypropylene.

Comparative Example 2

The procedure of Example 3 was repeated to obtain a foam, except that the liquid crystal resin was not mixed.

Comparative Example 3

The procedure of Example 4 was repeated to obtain a foam, except that the liquid crystal resin was not mixed.

Example 6

10 parts by weight of liquid crystal resin (LODRUN LC-5000 named in trade, liquid crystal transition point of 285° C., manufactured by Unitika K.K.), and 90 parts by weight of non-crosslinking low-density polyethylene resin (melting point of 134° C., MI=0.15), as a thermoplastic resin, were melt mixed in a twin-screw extruder with a screw diameter of 44 mm and set at a cylinder temperature of 290° C., and extruded in the form of strands for subsequent cutting by a pelletizer into pellets.

The observation was made regarding the form of liquid crystal resin using an electron microscope (at 500× magnification). A part (not lower than 50% or 60%) of the liquid crystal resin was found to be fibrillated.

100 parts by weight of the pellets obtained and 5 parts by weight of azodicarbonamide (foaming agent: decomposition initiating temperature of 200° C.) were melt mixed in a twin-screw extruder set at a cylinder temperature of 185° C., and extruded through a sheet-form die (exit dimensions: a width of 100 mm and a gap of 1 mm).

The extrusion was heated in an oven at 220° C. for 7 minutes to obtain a foamed sheet 150 mm wide and 1.5 mm thick. The foamed sheet exhibited an expansion ratio of about 3. The foamed sheet was ruptured under the presence of liquid nitrogen to observe its rupture cross-section by an electron microscope. The fibril-form liquid crystal resin was found to be dispersed in a part of polyethylene which formed cell membranes.

Comparative Example 4

The procedure of Example 6 was repeated to obtain a thermoplastic resin foam, except that the liquid crystal resin was not included.

Example 7

10 parts by weight of liquid crystal resin (LODRUN LC-5000 named in trade, liquid crystal transition point of 285° C., manufactured by Unitika K.K.), and 90 parts by weight of olefin resin, as a thermoplastic resin, which included 70 weight % of non-crosslinking polypropylene resin (melting point of 165° C., MI=10) and 30 weight % of silane-crosslinking homopolypropylene (XPM 800H named in trade, manufactured by Mitsubishi Chem. Co., melting point of 167° C.) were melt mixed in a twin-screw extruder set at a cylinder temperature of 290° C., and extruded in the form of strands which were taken off while stretched for subsequent cutting into pellets. Here, the form of liquid crystal resin was observed using an electron microscope (at 500×magnification). A majority of the liquid crystal resin was found to be fibrillated.

100 parts by weight of the pellets and 11 parts by weight of azodicarbonamide (foaming agent: decomposition initiating temperature of 200° C.) were melt mixed in a twin-screw extruder set at a cylinder temperature of 175° C., and extruded through a sheet-form die (exit dimensions: a width of 100 mm and a gap of 1 mm).

The extrusion was immersed in a boiling water at 100° C. for 4 hours for crosslinking treatment.

The extrusion was heated in an oven at 230° C. to obtain a foam 300 mm wide and 3 mm thick. The foam exhibited an expansion ratio of about 20. Also, the foam obtained was ruptured under the presence of liquid nitrogen to observe its rupture cross-section using an electron microscope. A majority of the liquid crystal resin was found to be left fibrillated for dispersion in polypropylene which formed cell membranes.

A gel fraction of polypropylene was also determined as being 24 weight %.

Comparative Example 5

The procedure of Example 7 was repeated to obtain a thermoplastic resin foam, except that the liquid crystal resin was not included.

Example 8

A composition containing 85 weight % of polypropylene (Tokuyama Polypro: RB110, melting point of 161° C. as determined by DSC) and 15 weight % of liquid crystal resin (Unitika: LODRUN LC3000, liquid crystal transition temperature of 185° C.) was fed to a hopper of a vented extruder. Concurrently, carbon dioxide was compressively introduced through a vent port under a pressure of 50 kg/cm$^2$ and at a flow rate of 30 g/min. After melt mixing thereof at 190° C., the resin composition was foam extruded at an output rate of 20 kg/hr through a die orifice having a diameter of 2 mm and set at 220° C. into a rod form.

The foam thus obtained exhibited an expansion ratio of 25, and was found to incorporate uniform cells.

A sample of 10 mm in thickness, 10 mm in width and 100 mm in length, was cut out from the foam obtained and placed in an oven at 180° C. for an hour. The sample exhibited a 5 mm shrinkage in a length direction.

Example 9

The procedure of Example 8 was followed to obtain a foam, except that the die orifice was set at 180° C. The foam thus obtained exhibited an expansion ratio of 25, and was found to have uniform cells. In the same manner as in Example 8, a sample was cut out from the foam obtained. After placed in an oven at 180° C. for an hour, the sample exhibited a shrinkage of 8 mm in its length direction.

Comparative Example 6

The procedure of Example 8 was followed to obtain a foam, except that polypropylene was the sole resin employed. The foam thus obtained exhibited an expansion ratio of 22. In the same manner as in Example 8, a sample was cut out from the foam obtained. After placed in an oven at 180° C. for an hour, the sample exhibited a shrinkage of 30 mm in its length direction.

Example 10

10 parts by weight of LODRUN LC3000 manufactured by Unitika Co. (liquid crystal transition point of 180° C., as determined by DSC), as a liquid crystal resin, 90 parts by weight of non-crosslinking low-density polyethylene resin (manufactured by Mitsubishi Chem. Co., product No. LH10N, melting point of 109° C., MI=0.15) as a thermoplastic resin, and 5 parts by weight of azodicarbonamide (foaming agent: decomposition initiating temperature of 200° C.) based on 100 parts by weight of the aforesaid two components were melt mixed in a twin-screw extruder set at a cylinder temperature of 185° C., and extruded through a sheet-form die (exit dimensions: a width of 100 mm and a gap of 1 mm).

The extrusion was heated in an oven at 220° C. for 7 minutes to obtain a foamed sheet 150 mm wide and 1.5 mm thick. The foamed sheet exhibited an expansion ratio of about 3. The foamed sheet was ruptured under the presence of liquid nitrogen to observe its rupture cross-section by an electron microscope. The flat-form liquid crystal resin was found to be dispersed in polyethylene which formed cell membranes.

Example 11

10 parts by weight of LODRUN LC5000 manufactured by Unitika Co. (liquid crystal transition temperature of 285° C. as determined by DSC), as a liquid crystal resin, and 90 parts by weight of olefin resin, as a thermoplastic resin, which contained 70 weight % of non-crosslinking homopolypropylene resin (manufactured by Mitsubishi Chem. Co., MA3, melting point of 163° C., MI=10) and 30 weight % of silane-crosslinking homopolypropylene (manufactured by Mitsubishi Chem. Co., XPM 800H, melting point of 167° C.), were melt mixed in a twin-screw extruder set at a cylinder temperature of 290° C., and extruded in the form of strands for subsequent cutting into pellets.

100 parts by weight of the pellets and 11 parts by weight of azodicarbonamide (foaming agent, decomposition initiating temperature of 200° C.) were melt mixed in a twin-screw extruder set at a cylinder temperature of 175° C., and extruded through a sheet-form die (exit dimensions: a width of 100 mm and a gap of 1 mm).

The extrusion was immersed in a boiling water at 100° C. for 4 hours for crosslinking treatment.

The extrusion was heated in an oven at 290° C. for 2 minutes to obtain a foamed sheet 300 mm wide and 3 mm thick. The foamed sheet exhibited an expansion ratio of 20. The foamed sheet was ruptured under the presence of liquid nitrogen to observe its rupture cross-section using an electron microscope. The liquid crystal resin was found to be partly fibrillated for dispersion in polypropylene which formed cell membranes.

Comparative Example 7

The procedure of Example 10 was repeated to obtain a foam, except that the liquid crystal resin was not mixed.

Comparative Example 8

The procedure of Example 11 was repeated to obtain a foam, except that the liquid crystal resin was not mixed.

Example 12

14 parts by weight of VECTRA A950 manufactured by Polyplastics Co. (liquid crystal transition point of 285° C., as determined by DSC), as a liquid crystal resin, and 60 parts by weight of non-crosslinking homopropylene (melting point of 165° C., MI=0.3, EA9A manufactured by Mitsubishi Chem. Co.), as a thermoplastic resin, were melt mixed in a twin-screw extruder set at a cylinder temperature of 290° C., and extruded in the form of strands which were then cooled in a water bath for subsequent cutting into pellets.

74 parts by weight of the pellets, 25 parts by weight of crosslinking homopolypropylene (manufactured by Mitsubishi Chem. Co., XPM 800H, melting point of 167° C.), 1 part by weight of a catalytic crosslinker-incorporating masterbatch (manufactured by Mitsubishi Chem. Co.,—catalyst PZ-10S), and 22 parts by weight of azodicarbonamide (foaming agent: decomposition initiating temperature of 200° C.) based on 100 parts by weight of the aforementioned three components were melt mixed in a twin-screw extruder set at a cylinder temperature of 175° C., and extruded through a sheet-form die (exit dimensions: a width of 100 mm and a gap of 1 mm) to obtain an expandable sheet.

This extrusion was heated in an oven at 230° C. for 7 minutes to obtain a foamed sheet 350 mm wide and 3.5 mm thick. The foamed sheet exhibited an expansion ratio of 40. The foamed sheet was ruptured under the presence of liquid nitrogen to observe its rupture cross-section by an electron microscope. A majority of the liquid crystal resin was found to be fibrillated for dispersion in polypropylene which formed cell membranes.

Example 13

62 parts by weight of LODRUN LC3000 manufactured by Unitika Co. (liquid crystal transition point of 180° C., as determined by DSC), as a liquid crystal resin, 19 parts by weight of non-crosslinking homopropylene (melting point of 165° C., MI=10) and 18 parts by weight of crosslinking homopolypropylene (manufactured by Mitsubishi Chem. Co., XPM 800H, melting point of 167° C.), as a thermoplastic resin, 1 part by weight of a catalytic crosslinker-incorporating masterbatch (manufactured by Mitsubishi Chem. Co.,—catalyst PZ-10S), and 5 parts by weight of azodicarbonamide (foaming agent: decomposition initiating temperature of 200° C.) based on 100 parts by weight of the aforementioned four components were melt mixed in a twin-screw extruder set at a cylinder temperature of 175° C., extruded through a sheet-form die (exit dimensions: a width of 100 mm and a gap of 1 mm) to obtain an expandable sheet.

This extrusion was immersed in a boiling water at 100° C. for 4 hours for crosslinking treatment.

The extrusion was heated in an oven at 230° C. for 7 minutes to obtain a foamed sheet 150 mm wide and 1.5 mm thick. The foamed sheet exhibited an expansion ratio of 3. A visual observation of the foamed sheet revealed lack of uniformity in cell diameter, as well as somewhat uneven cell formation.

Example 14

10 parts by weight of VECTRA A950 manufactured by Polyplastics Co. (liquid crystal transition point of 285° C., as determined by DSC), as a liquid crystal resin, and 90 parts by weight of non-crosslinking homopropylene (melting point of 165° C., MI=0.3, EA9A manufactured by Mitsubishi Chem. Co.), as a thermoplastic resin, were melt mixed in a twin-screw extruder set at a cylinder temperature of 290° C., extruded in the form of strands which were then cooled in a water bath for subsequent cutting into pellets.

These pellets were fed to a 50 mm single-screw extruder for mixing at 190° C. with carbon dioxide which were compressively introduced through a vent port at a flow rate of 30 g/min and under a pressure of 50 kg/cm$^2$.

The mixed resin composition was foam extruded at an output rate of 20 kg/hour from an extruder die maintained at a temperature of 167° C. and having an exit with a gap of 3 mm and a width of 50 mm to a smooth finished, cooled mold which was directly coupled to the die exit and measured 10 mm thick and 150 mm wide.

The foam thus obtained exhibited an expansion ratio of 25 and was found to have uniform cells.

Evaluation of Forms

A sheet 100 mm wide and 300 mm long was cut out from each of the foams obtained. After subjected to heat treatment at 80° C. for 5 hours, each sheet was placed in a temperature-controlled chamber. The atmospheric temperature was elevated from 30° C. ($T_1$) to 60° C. ($T_2$) to measure a dimensional change of the sheet in a length direction (a difference between a length ($L_2$) at 60° C. and a length ($L_1$) at 30° C.) and calculate a change rate relative to the length ($L_1$) at 30° C. The change rate was further divided by the temperature differential ($T_2-T_1$) to determine a coefficient α of thermal expansion.

Specifically, the following equation was employed:

$$\alpha = (L_2 - L_1)/L_1(T_2 - T_1) [1/^\circ C.]$$

Also, a sheet 40 mm wide and 100 mm long was cut out from each of the foams. Other than the dimension of the test piece, JIS K 7221 was followed to carry out a three-point bending test at atmospheric temperature under the condition of a span of 50 mm and a crosshead descending rate of 25 mm/min. A flexural modulus was determined according to JIS K7221 from an initial slope of an autographically recorded S—S curve.

In addition, a 25% compressive strength was determined using a 50 mm ×50 mm square test piece, according to JIS K6767.

The forgoing results, together with respective constitutions of Examples and Comparative Examples, are given in Tables 1–4.

In Table 1, PP represents polypropylene, PE represents polyethylene, and ADCA represents azodicarbonamide.

TABLE 2

| | | Composition (Parts by Weight) | | | |
|---|---|---|---|---|---|
| | | Thermoplastic Resin | Liquid Crystal Resin | Crosslinking Resin | Blowing Agent |
| Exp. | 1 | 90 | 10 | | |
| | 2 | 90 | 10 | | |
| | 3 | 63 | 10 | 27 | 11 |
| | 4 | 72 | 10 | 18 | 11 |
| | 5 | 35 | 65 | | |
| | 6 | 90 | 10 | | 5 |
| | 7 | 63 | 10 | 27 | 11 |
| | 8 | 85 | 15 | | |
| | 9 | 85 | 15 | | |
| | 10 | 90 | 10 | | 5 |
| | 11 | 63 | 10 | 27 | 11 |
| | 12 | 60 | 14 | 26 | 22 |
| | 13 | 19 | 62 | 19 | 5 |
| | 14 | 90 | 10 | | |
| Comp. Exp. | 1 | 100 | | | |
| | 2 | 70 | | 30 | 11 |
| | 3 | 80 | | 20 | 11 |
| | 4 | 100 | | | 5 |
| | 5 | 70 | | 30 | 11 |
| | 6 | 100 | | | |
| | 7 | 100 | | | 5 |
| | 8 | 70 | | 30 | |

TABLE 1

| | | Forming Method | Type of Thermoplastic Resin | Liquid Crystal Resin | Crosslinking Resin | Blowing Agent |
|---|---|---|---|---|---|---|
| Exp. | 1 | Extrusion Foaming | P P | Lodrun LC3000 | | Carbon Dioxide |
| | 2 | Extrusion Foaming | P P | Lodrun LC5000 | | Carbon Dioxide |
| | 3 | Sheet Foaming | P P | Lodrun LC5000 | Silane-Crosslinking PP | A D C A |
| | 4 | Sheet Foaming | P E | Lodrun LC3000 | Silane-Crosslinking PE | A D C A |
| | 5 | Extrusion Foaming | P P | Lodrun LC3000 | | Carbon Dioxide |
| | 6 | Sheet Foaming | P E | Lodrun LC5000 | | A D C A |
| | 7 | Sheet Foaming | P P | Lodrun LC5000 | Silane-Crosslinking PP | A D C A |
| | 8 | Extrusion Foaming | P P | Lodrun LC3000 | | Carbon Dioxide |
| | 9 | Extrusion Foaming | P P | Lodrun LC3000 | | Carbon Dioxide |
| | 10 | Sheet Foaming | P E | Lodrun LC3000 | | A D C A |
| | 11 | Sheet Foaming | P P | Lodrun LC5000 | Silane-Crosslinking PP | A D C A |
| | 12 | Sheet Foaming | P P | Vectra A 9 5 0 | Silane-Crosslinking PP | A D C A |
| | 13 | Sheet Foaming | P P | Lodrun LC3000 | Silane-Crosslinking PP | A D C A |
| | 14 | Extrusion Foaming | P P | Vectra A 9 5 0 | | Carbon Dioxide |
| Comp. Exp. | 1 | Extrusion Foaming | P P | | | Carbon Dioxide |
| | 2 | Sheet Foaming | P P | | Silane-Crosslinking PP | A D C A |
| | 3 | Sheet Foaming | P E | | Silane-Crosslinking PE | A D C A |
| | 4 | Sheet Foaming | P E | | | A D C A |
| | 5 | Sheet Foaming | P P | | Silane-Crosslinking PP | A D C A |
| | 6 | Extrusion Foaming | P P | | | Carbon Dioxide |
| | 7 | Sheet Foaming | P E | | | A D C A |
| | 8 | Sheet Foaming | P P | | Silane-Crosslinking PP | A D C A |

TABLE 3

|  |  | Liquid Crystal Resin Transition Temp. | Decomposition Temp. of Blowing Agent | Mixing Temp. of Liquid Crystal Resin | Foaming Temp. | Expansion Ratio |
|---|---|---|---|---|---|---|
| Exp. | 1 | 180 |  | 200 | 167 | 20 |
|  | 2 | 285 |  | 290 | 167 | 20 |
|  | 3 | 285 | 200 | 290 | 230 | 20 |
|  | 4 | 180 | 200 | 200 | 220 | 20 |
|  | 5 | 180 |  | 200 | 167 | 3 |
|  | 6 | 285 | 200 | 290 | 220 | 3 |
|  | 7 | 285 | 200 | 290 | 230 | 20 |
|  | 8 | 185 |  |  | 220 | 25 |
|  | 9 | 185 |  |  | 180 | 25 |
|  | 10 | 180 | 200 | 185 | 220 | 3 |
|  | 11 | 285 | 200 | 290 | 290 | 20 |
|  | 12 | 285 | 200 | 290 | 230 | 40 |
|  | 13 | 180 | 200 | 185 | 230 | 3 |
|  | 14 | 285 |  | 290 | 167 | 25 |
| Comp. | 1 |  |  |  |  | 20 |
| Exp. | 2 |  |  |  |  | 20 |
|  | 3 |  |  |  |  | 20 |
|  | 4 |  | 200 |  | 220 | 3 |
|  | 5 |  | 200 |  | 230 | 20 |
|  | 6 |  |  |  | 167 | 22 |
|  | 7 |  | 200 |  | 220 | 3 |
|  | 8 |  | 200 |  | 290 | 20 |

Note: All temperatures in unit of ° C.

TABLE 4

|  |  | Rate of Fibrillation* | Thermal Expansion Coefficient ($\times 10^{-5}$) | Flexural Modulus (GPa) | Compressive Strength (kgf/cm$^2$) | Dimensional Change per Meter after 1 hr at 180° C. |
|---|---|---|---|---|---|---|
| Exp. | 1 | 20 or Higher | 7.1 | 0.32 | 1.5 | 1.5 |
|  | 2 | 60 or Higher | 3.6 | 0.53 | 2.4 | 2.4 |
|  | 3 | 60 or Higher | 4.8 | 0.58 | 2.5 | 2.5 |
|  | 4 | 30 or Higher | 6.3 | 0.31 | 1.8 | 1.8 |
|  | 5 | Undisernible | 2.0 | 0.94 | 23.2 |  |
|  | 6 | 50 or Higher | 7.1 | 0.71 | 14.3 |  |
|  | 7 | 70 or Higher | 5.3 | 0.34 | 2.5 | 2.5 |
|  | 8 | 30 or Higher | 5.8 | — | — | 5 |
|  | 9 | 20 or Higher | 6.1 | — | — | 8 |
|  | 10 | 30 or Higher | 8.1 | 0.62 | 14.6 |  |
|  | 11 | 50 or Higher | 6.3 | 0.31 | 2.3 | 2.3 |
|  | 12 | 80 or Higher | 4.9 | 0.23 | 0.5 |  |
|  | 13 | Undisernible | 2.1 | 3.78 | 21.6 |  |
|  | 14 | 80 or Higher | 3.5 | 0.43 | 2.9 | 4 |
| Comp. | 1 |  | 13.2 | 0.21 | 0.8 | 0.8 |
| Exp. | 2 |  | 13 | 0.22 | 1.1 | 1.1 |
|  | 3 |  | 15.2 | 0.13 | 0.7 |  |
|  | 4 |  | 15.2 | 0.41 | 6.2 |  |
|  | 5 |  | 13 | 0.22 | 1.3 |  |
|  | 6 |  | 13.3 | — | — | 30 |
|  | 7 |  | 15.2 | 0.41 | 6.2 |  |
|  | 8 |  | 13 | 0.22 | 1.3 |  |

*Percentage of the liquid crystal resin which was fibrillated for dispersion in the foam to exhibit an aspect ratio of 2 or higher The foams of Examples 1–5 all exhibit excellent thermal expansion coefficients and flexural modulus. In particular, the foams of Examples 2–4 respectively including the dispersals of fibril-form liquid crystal resins are preferable than the foam of Example 1. On the other hand, the foams of Comparative Examples 1–3, free of the liquid crystal resin, exhibit inferior thermal expansion coefficients and flexural modulus.

Also, with the use of liquid crystal resin, Examples 6–11 results in production of foams which exhibit reduced thermal expansion coefficients, and accordingly excellent heat distortion resistance and dimensional stability, increased flexural modulus, 25% compressive strength and mechanical strength compared to those obtained in Comparative Examples 4–9.

Also, those methods described in Examples 12 and 14 are capable of providing foams which similarly exhibit reduced thermal expansion coefficients, increased flexural modulus and 25% compressive strength.

Furthermore, although a slightly higher proportion of liquid crystal resin was incorporated, the foam obtained in Example 13 still exhibits an expansion ratio of 3, which is comparable to that of the foam obtained in Example 5. This demonstrates that the inclusion of liquid crystal resin is effective in obtaining a foam which exhibits a higher expansion ratio compared to foams incorporating liquid crystal resin solely, and improved mechanical properties, i.e., a reduced thermal expansion coefficient, an improved heat distortion resistance and an increased flexural modulus compared to those of the foams obtained in Comparative Examples 1–8.

What is claimed is:

1. An expandable synthetic resin composition characterized as including a thermoplastic resin, a liquid crystal resin and a heat-decomposable foaming agent; wherein said liquid crystal resin is fibrillated to a degree of fibrillation of 10% or higher.

2. The expandable synthetic resin composition as recited in claim 1, wherein 0.1–60 parts by weight of the liquid crystal resin is included relative to 40–99.9 parts by weight of the thermoplastic resin.

3. The expandable synthetic resin composition as recited in claim 1 or 2, wherein said heat-decomposable foaming agent is included in an amount of 0.5–30 parts by weight, based on 100 parts by weight of said thermoplastic and liquid crystal resins.

4. The expandable synthetic resin composition as recited in any one of claims 1 or 2, wherein said thermoplastic resin consists at least partly of a crosslinking resin.

5. A synthetic resin foam characterized as including a thermoplastic resin and a liquid crystal resin dispersed in the thermoplastic resin and as exhibiting an expansion ratio of 20–30; wherein the liquid crystal resin has a diameter of 1 to 10 μm and an aspect ratio of not less than 10 wherein the liquid crystal resin is fibrillated to the degree of fibrillation of 10% or higher.

6. The synthetic resin foam as recited in claim 5, wherein 0.1–60 parts by weight of the liquid crystal resin is dispersed in 40–99.9 parts by weight of the thermoplastic resin.

7. The synthetic resin foam as recited in claim 5 or 6, wherein said liquid crystal resin is at least partly fibrillated.

8. The synthetic resin foam as recited in any one of claims 6 or 7, wherein said thermoplastic resin is a polyolefin resin.

9. The synthetic resin foam as recited in claim 8, characterized in that said polyolefin resin comprises a non-crosslinking polyolefin resin and a crosslinking polyolefin resin.

10. The expandable synthetic resin composition of claim 1, wherein the fibrillated liquid crystal resin has a diameter of 1 to 10 μm and an aspect ratio of not less than 10.

11. The expandable synthetic resin composition of claim 1, wherein the composition has a fibrillation ratio of more than 30%.

* * * * *